(No Model.)
M. T. HAYES.
HORSE COLLAR FASTENER.
No. 361,357. Patented Apr. 19, 1887.
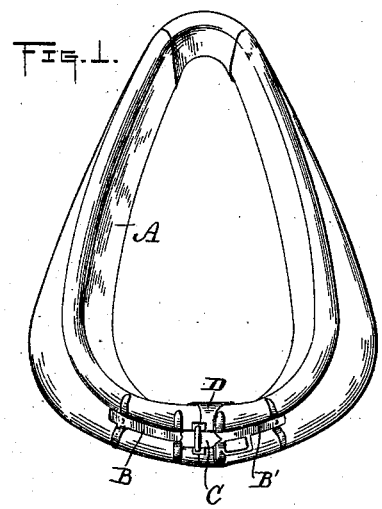
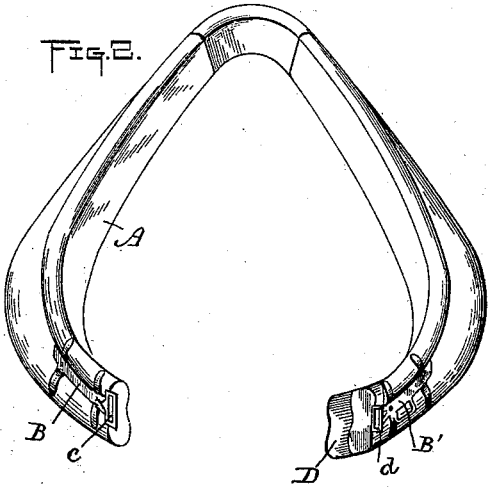
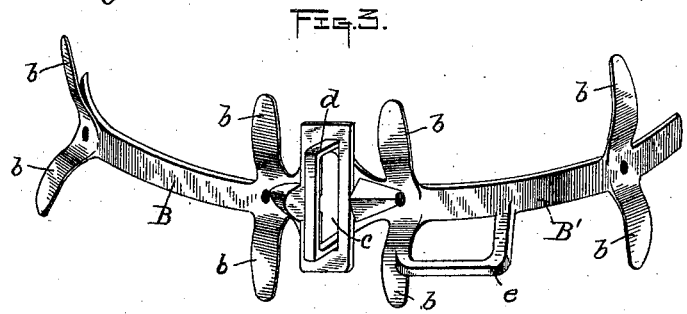
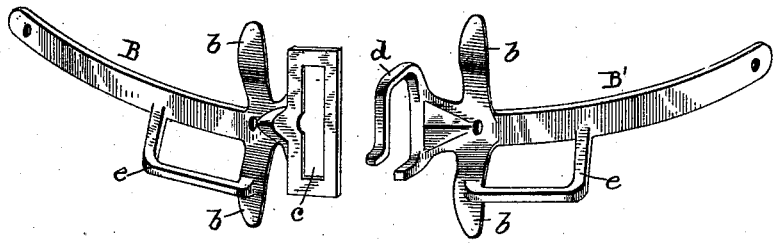

UNITED STATES PATENT OFFICE.

MILES THOMAS HAYES, OF BURLINGTON, WISCONSIN, ASSIGNOR OF TWO-THIRDS TO JACOB W. WAMBOLD AND WILLIAM A. BENNETT, BOTH OF SAME PLACE.

HORSE-COLLAR FASTENER.

SPECIFICATION forming part of Letters Patent No. 361,357, dated April 19, 1887.

Application filed January 24, 1887. Serial No. 225,308. (No model.)

*To all whom it may concern:*

Be it known that I, MILES THOMAS HAYES, a citizen of the United States, residing at Burlington, in the county of Racine and State of Wisconsin, have invented certain new and useful Improvements in Horse-Collar Fastenings, of which the following is a specification, reference being had therein to the accompanying drawings.

The object of my invention is to provide a simple and effective fastening for separable horse-collars, or collars which are hinged together at their tops, but open at their bottoms or throat portions, so that they may be placed on the necks of the animals right side up, and thereby avoid the trouble of turning a collar after passing it over the animal's head, the present invention being thus for the same purpose as the fastening covered by my Patent No. 339,098, dated March 30, 1886.

In the drawings, Figures 1 and 2 are perspective views of a collar with my invention applied thereto, and Figs. 3 and 4 are detail perspective views of different forms of fasteners.

A denotes a separable collar, made in two pieces hinged together at their tops, and provided at their lower or front ends with the metallic fasteners B and B', by which the said collar may be secured together in front. The body portion of each of these fasteners consists of a plain bar of metal somewhat curved, so as to fit in the recess or groove in the collar, the said body portions being provided with curved or inclined projecting lugs or arms $b$, extending laterally therefrom. The fasteners are secured to the collars by suitable screws, bolts, or rivets, passing through the collars and the body portions of the fastenings, and the said lugs or arms bear against the collar and steady the fastenings in place and prevent them from turning.

The body portions of the fasteners may be provided with any desired number of these lugs or arms.

The fastener B is provided with a slot or aperture, $c$, to receive the loop or staple $d$ on the fastener B', the said loop or staple being long enough to project through the slot $c$ to receive a key, C, adapted to fit said loop to hold the fasteners together. This key may be an independent piece of leather or other suitable material, or the end of the hame-strap may be utilized as the key.

Instead of making the staple $d$ in the form of a closed loop, as in Figs. 3 and 5, it may be in the form of a hook, as in Fig. 4, the loop being thus open at one side to permit the key C to be inserted sidewise.

One or both of the fasteners may be provided with loops $e$, for the reception of the martingale-strap, to prevent the said strap from falling off from the collar when the latter is opened.

In connection with my separable collar, I prefer to use the guard or protector D, such as is shown and described in my former patent above referred to.

To secure a separable collar which is provided with my fasteners together, it is only necessary to spring the fastener B over the fastener B' in such a manner that the loop or staple $d$ on the latter will enter and pass through the slot $c$ in the former, and then insert the key C in the said loop or staple to prevent the separation of the fasteners.

Having thus described my invention, I claim and desire to secure by Letters Patent—

1. A fastening for separable horse-collars, consisting of the two parts or fasteners B and B', the body portions of which are plain bars of metal somewhat curved to fit the groove in the collar, and provided with curved or inclined projecting lugs or arms $b$, the part B having the slot $c$, and the part B' being provided with the loop or staple $d$, of suitable length to project through the said slot to receive a key, substantially as set forth.

2. A fastening for separable horse-collars, consisting of the two parts or fasteners B and B', having curved body portions provided with projecting arms $b$, one of the said fasteners having a slot and the other a loop or staple fitting in the said slot, and one or both of the said fasteners having a loop, as $e$, to receive the martingale-strap, substantially as set forth.

In testimony whereof I affix my signature in presence of two witnesses.

MILES THOMAS HAYES.

Witnesses:
FR. REUSCHLEIN,
A. F. RANSOM.